(12) United States Patent
Kahn et al.

(10) Patent No.: US 9,876,990 B2
(45) Date of Patent: *Jan. 23, 2018

(54) SECURE DELIVERY OF PROGRAM CONTENT VIA A REMOVABLE STORAGE MEDIUM

(71) Applicant: The DIRECTV Group, Inc., El Segundo, CA (US)

(72) Inventors: Raynold M. Kahn, Los Angeles, CA (US); Philip I. Siegel, Fountain Valley, CA (US)

(73) Assignee: THE DIRECTV GROUP, INC., El Segundo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/138,150

(22) Filed: Apr. 25, 2016

(65) Prior Publication Data

US 2016/0241814 A1    Aug. 18, 2016

Related U.S. Application Data

(63) Continuation of application No. 11/501,985, filed on Aug. 10, 2006, now Pat. No. 9,325,944.

(Continued)

(51) Int. Cl.
| | |
|---|---|
| H04N 9/80 | (2006.01) |
| H04N 7/16 | (2011.01) |
| H04N 5/765 | (2006.01) |
| H04N 5/775 | (2006.01) |
| H04N 5/781 | (2006.01) |
| H04N 5/85 | (2006.01) |
| H04N 5/907 | (2006.01) |

(Continued)

(52) U.S. Cl.
CPC ............ *H04N 7/163* (2013.01); *H04N 5/765* (2013.01); *H04N 5/775* (2013.01); *H04N 5/781* (2013.01); *H04N 5/85* (2013.01); *H04N 5/907* (2013.01); *H04N 5/913* (2013.01); *H04N 9/7921* (2013.01); *H04N 9/7925* (2013.01); *H04N 9/8042* (2013.01); *H04N 9/8047* (2013.01); *H04N 21/2541* (2013.01); *H04N 21/4147* (2013.01); *H04N 21/42669* (2013.01); *H04N 21/4325* (2013.01); *H04N 21/4367* (2013.01); *H04N 21/4405* (2013.01); *H04N 21/4627* (2013.01); *H04N 21/47211* (2013.01); *H04N 21/835* (2013.01); *H04N 2005/91364* (2013.01)

(58) Field of Classification Search
CPC ............ H04N 9/80; H04N 7/167; H04L 9/00
USPC ............... 386/239, 248, 257, 259, 258, 260; 380/200, 277, 227, 228, 713, 239
See application file for complete search history.

(56) References Cited

U.S. PATENT DOCUMENTS

| | | | | |
|---|---|---|---|---|
| 6,832,319 B1* | 12/2004 | Bell | ........................ | H04N 7/163 348/E7.056 |
| 8,140,859 B1* | 3/2012 | Kahn | ..................... | H04N 5/913 380/277 |
| 2003/0149988 A1* | 8/2003 | Ellis | ................... | H04N 5/44543 725/87 |

* cited by examiner

*Primary Examiner* — Daquan Zhao
(74) *Attorney, Agent, or Firm* — Gates & Cooper LLP

(57) ABSTRACT

A method and apparatus for delivering video program content with selective viewing capability. An apparatus in accordance with the present invention comprises a personal video recorder (PVR), which can be a portion of an Integrated Receiver Decoder (IRD), an access key, coupled to the PVR, and a storage medium containing the video program content, wherein the video program content is stored on the storage medium in an encrypted manner, the access (Continued)

key is used to access the program content on the storage medium, and the storage medium is removable from the PVR.

20 Claims, 3 Drawing Sheets

Related U.S. Application Data

(60) Provisional application No. 60/707,387, filed on Aug. 11, 2005.

(51) Int. Cl.
*H04N 5/913* (2006.01)
*H04N 9/79* (2006.01)
*H04N 9/804* (2006.01)
*H04N 21/254* (2011.01)
*H04N 21/4147* (2011.01)
*H04N 21/426* (2011.01)
*H04N 21/432* (2011.01)
*H04N 21/4367* (2011.01)
*H04N 21/4405* (2011.01)
*H04N 21/4627* (2011.01)
*H04N 21/472* (2011.01)
*H04N 21/835* (2011.01)
*H04N 7/167* (2011.01)
*H04N 19/00* (2014.01)

SECURE DELIVERY OF PROGRAM CONTENT VIA A REMOVABLE STORAGE MEDIUM

CROSS-REFERENCE TO RELATED APPLICATIONS

This application is a continuation of U.S. patent application Ser. No. 11/501,985, entitled "SECURE DELIVERY OF PROGRAM CONTENT VIA A REMOVABLE STORAGE MEDIUM," by Raynold M. Kahn and Philip I. Siegel, filed Aug. 10, 2006, now issued as U.S. Pat. No. 9,325,944, which application claims benefit of U.S. Provisional Patent Application No. 60/707,387, entitled "SECURE DELIVERY OF PROGRAM CONTENT VIA A REMOVABLE STORAGE MEDIUM," by Raynold M. Kahn and Philip I. Siegel, filed Aug. 11, 2005, both of which applications are hereby incorporated by reference herein.

BACKGROUND OF THE INVENTION

1. Field of the Invention

The present invention relates generally to video programming, and, in particular, to secure delivery of program content via a removable storage system.

2. Description of the Related Art

The current video content rental model requires a customer to visit a video retail store and rent a videocassette or Digital Video Disc (DVD) for a limited period of time for viewing. Typically, the rentals are for recent film releases, but could also be for classic older films, sporting or musical events, or Direct-to-Video offerings. The content of either the videocassette or DVD is done in a standard manner such that the medium can be played on any standard cassette or DVD player.

The limitation on time that applies to the rental serves two purposes; one, the cassette or DVD can be rented out to another person, so the video retail store can have fewer copies of that specific movie or event; and two, to prevent a customer from making extensive copies of the cassette or DVD or sharing the cassette or DVD with others and avoiding multiple rental charges for a given video program content.

Other attempts have been made to provide alternative methods for movie distribution. DIVX, via their parent company CIRCUIT CITY, developed an encryption method and technology which allowed a specially encrypted DVD to be sold at retail at a lower price than an unencrypted DVD, but the encrypted DVD would only be viewable for a limited time. Typically, the limited time would be a forty-eight hour window, beginning at the time of first viewing. Additional viewing times would be available, for an additional fee, using a report-back of viewing via telephone from the DVD player. However, this would require a new decryption key from a home office, as well as a specialized DVD player that was connected to a telephone line, to determine time of first viewing, additional viewing time support, etc., as well as active key management for each title that was sold.

It can be seen, then, that there is a need in the art for a method and apparatus for delivering program content via a removable storage device. It can also be seen, then, that there is a need in the art for a method and apparatus for delivering the program content in a cost-efficient manner. It can also be seen that there is a need in the art for a method and apparatus that delivers the program content in a secure fashion.

SUMMARY OF THE INVENTION

To minimize the limitations in the prior art, and to minimize other limitations that will become apparent upon reading and understanding the present specification, the present invention discloses a method and apparatus for delivering video program content with selective viewing capability. An apparatus in accordance with the present invention comprises a personal video recorder (PVR), an access key, coupled to the PVR, and a storage medium containing the video program content, wherein the video program content is stored on the storage medium in an encrypted manner, the access key is used to access the program content on the storage medium, and the storage medium is removable from the PVR.

Other features and advantages are inherent in the system and method claimed and disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Overview

Figure 1:
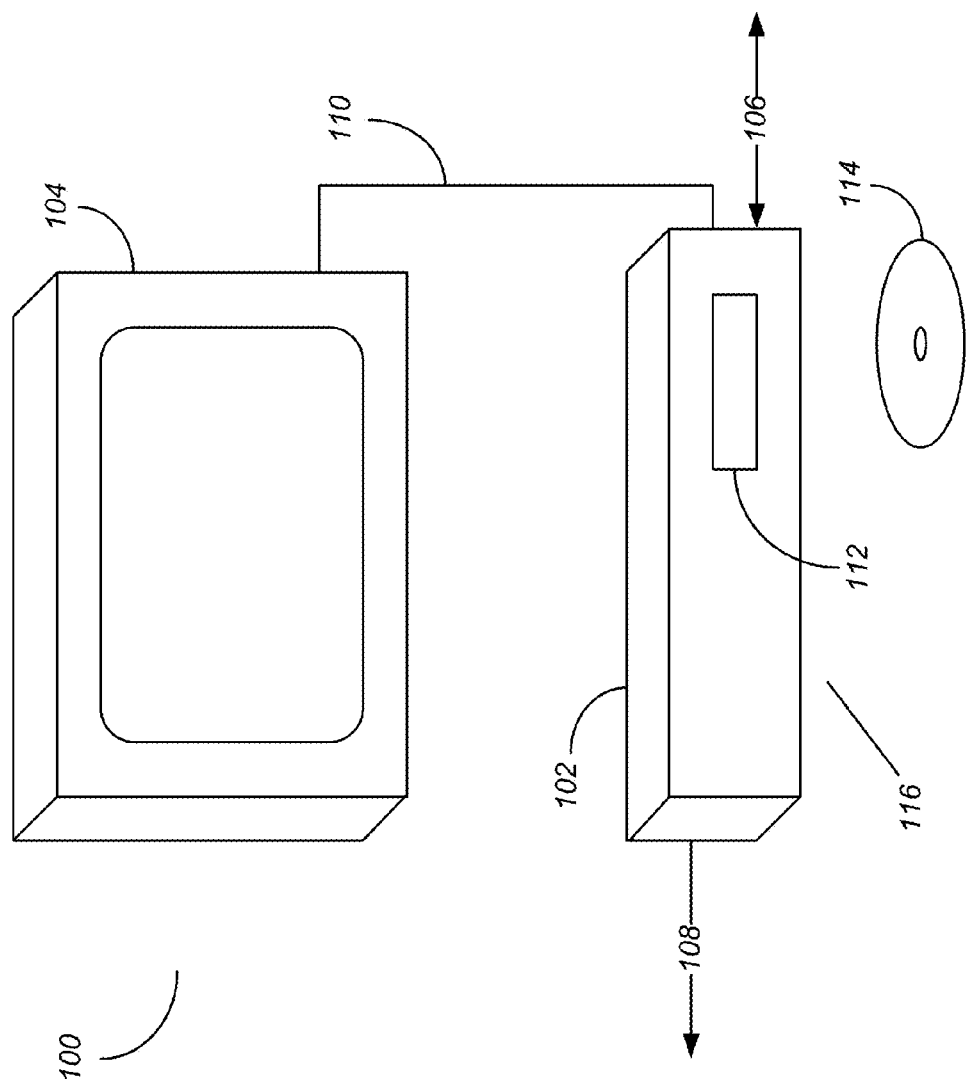
FIG. 1 illustrates a typical embodiment of the present invention.

FIG. 1 illustrates a typical embodiment of the present invention.

System 100 comprises a Personal Video Recorder (PVR) 102 and a display device such as a monitor 104. PVR 102 is typically electrically coupled to cable 106 for delivery of cable, satellite, or other television or video programming channels for viewing on monitor 104. PVR 102 is also coupled to a telephone line via cable 108 and to monitor 104 via cable 110. PVR 102 can also include an Integrated Receiver Decoder (IRD) 116 for recording and/or viewing of satellite direct broadcast television signals.

The IRD 116 typically receives satellite signals that are decoded and delivered to a television set for viewing by a user. The IRD 116 selects the satellite signal by use of Direct Current (DC) voltages and modulated tone signals that are sent to a multiswitch to select a satellite signal of interest. The IRD 116 demodulates the selected satellite signal and performs error-correction decoding to obtain a digital packet datastream from which the IRD 116 extracts the video and audio data associated with a desired television program, then decrypts and decodes such data to obtain the television signal that is delivered to the television set.

PVR 102 comprises a media I/O device 112 which allows a user to enter data into PVR 102 to command the PVR 102 to perform the functions described herein. This data may also be provided to monitor 104 to assist the user. Typically, a removable storage device 114, such as a Digital Video Disc (DVD) 114 can be used as the delivery system to the media I/O device 112, however other removable storage devices, such as removable hard drives, zip drives, Random Access Memory (RAM), Universal Serial Bus (USB) tokens, flash memory devices such as SD or CF cards, or other storage devices that can be removed and placed into PVR 102 to deliver program content or other data to PVR 102 are envisioned.

Typically, DVDs 114 are unencrypted and/or unencoded, or are generically encrypted or encoded, and hence can be played on any player that accepts a DVD 114. However, as described herein, generically encoded DVDs 114 that can be played on any standard player have associated copying problems, and rental DVDs 114 have other time-sensitive associated issues. The present invention allows for a specially encoded DVD 114, or a DVD 114 with a special access key that associates the DVD 114 to a specific PVR 102 (or set of PVRs 102 as described herein), to limit the access and viewing of the program content present on a given DVD 114 on the PVR 102 and monitor 104.

The present invention is directed to a secure, removable, storage capability in an integrally encrypted PVR 102 that serves as an interchangeable, refreshable source of content from a commercial content provider. A commercial content provider can be, e.g., a video rental store, such as BLOCK-BUSTER VIDEO or HOLLYWOOD VIDEO, or the content can be provided directly from other sources, via postal mail or other electronic delivery services such as the Internet, or broadcast via cable or satellite to the PVR 102.

The content, which is typically a movie or other video program, is encrypted by the content provider and stored on the removable storage device 114, e.g., removable hard drive, rewritable DVD, standard DVD, super DVD, etc. The content can later be decrypted and viewed on a restricted set of authorized PVRs 102, where the ability to view the content on the removable storage device 114 is placed under control of either the content provider (the production house or studio that generates the content, e.g., FOX ENTERTAINMENT, UNIVERSAL STUDIOS, etc.), or another service provider (such as the satellite service provider, e.g., DIRECTV).

In a typical PVR 102 that is coupled to a satellite direct broadcast system, the IRD portion of the PVR 102 comprises a content protection system. The present invention makes use of the content protection system that is built into the IRD portion of the PVR 102 to allow selective access to whatever content is present on the removable storage device 114.

Although the encrypted content is written onto the removable storage device 114, the decryption and viewing are performed by decryption hardware identical to that already provided in the IRD portion of the PVR 102. By managing the access codes, also known as "keys," the content provider can restrict decryption to a specific authorized PVR 102 or set of PVRs 102.

User Selection of Content

In a first embodiment of the present invention, the removable storage device 114, such as a removable hard drive or rewritable DVD, is brought by a user to a vendor, such as a video store, kiosk, DVD rewrite drive of a computer, etc. The user then selects which content, e.g., movies, sporting events, documentaries, etc., that the user would like to view at home, and brings the titles of the desired content or otherwise indicates which programs are desired. It is also envisioned that such a service could be a self-service kiosk, or could be delivered via the Internet to a user's computer, where the user views the titles or other available content on the kiosk or on a computer. Once the titles and/or other content have been selected, the content is written to the storage medium in an encrypted fashion on the removable storage device 114, which is then returned to the user. The user takes the removable storage device 114 back to their PVR 102 at home for private viewing. The user is billed for this service at the vendor location, via a credit card charge over the Internet, or, alternatively, can be billed on a Pay-Per-View (PPV) basis through a PVR 102 callback method used to authorize PPV content delivered on specific PPV channels present on the IRD portion of the PVR 102.

The present invention uses a "key" to authorize the specific removable storage device to be used on a specific PVR 102. The key used on the removable storage device 114 and the key used on the specific PVR 102 must match for the PVR 102 to be able to decrypt the content recorded on the removable storage device 114. There are other methods of key authorization which have been utilized in the art which can also be used without departing from the scope of the present invention.

The key is similar to an authorization code which is used in the authorization of an IRD 116 when it is initially connected to a satellite broadcast system. This key is then used to either authorize a specific removable storage device 114, or as a registration/billing tag for viewing a program on any specific removable storage device 114. The PVR 102 will not allow viewing until the key is validated, checked against the key present on the removable storage device 114, and/or payment has been made to view the content stored on the removable storage device 114.

In conjunction with the embodiment mentioned above, the key used for content encryption can be specific for a specific PVR 102, or a specific group of PVRs 102 that share a common "family key" that is used to decrypt the removable storage device 114. Alternatively, the content encryption can be generic relative to the population of all PVRs 102 used for a given service (but not generic DVD players), but access to the encrypted content is limited by use of an "access key" which can be specific to a single PVR 102 or group of PVRs 102 sharing the "family key" described above.

The family key is further described in application Ser. No. 09/620,773, entitled, "SUPER ENCRYPTED STORAGE AND RETRIEVAL OF MEDIA PROGRAMS WITH MODIFIED CONDITIONAL ACCESS FUNCTIONALITY," by Raynold M. Kahn et al., which is incorporated by reference herein.

IRD Functionality

Figure 2:
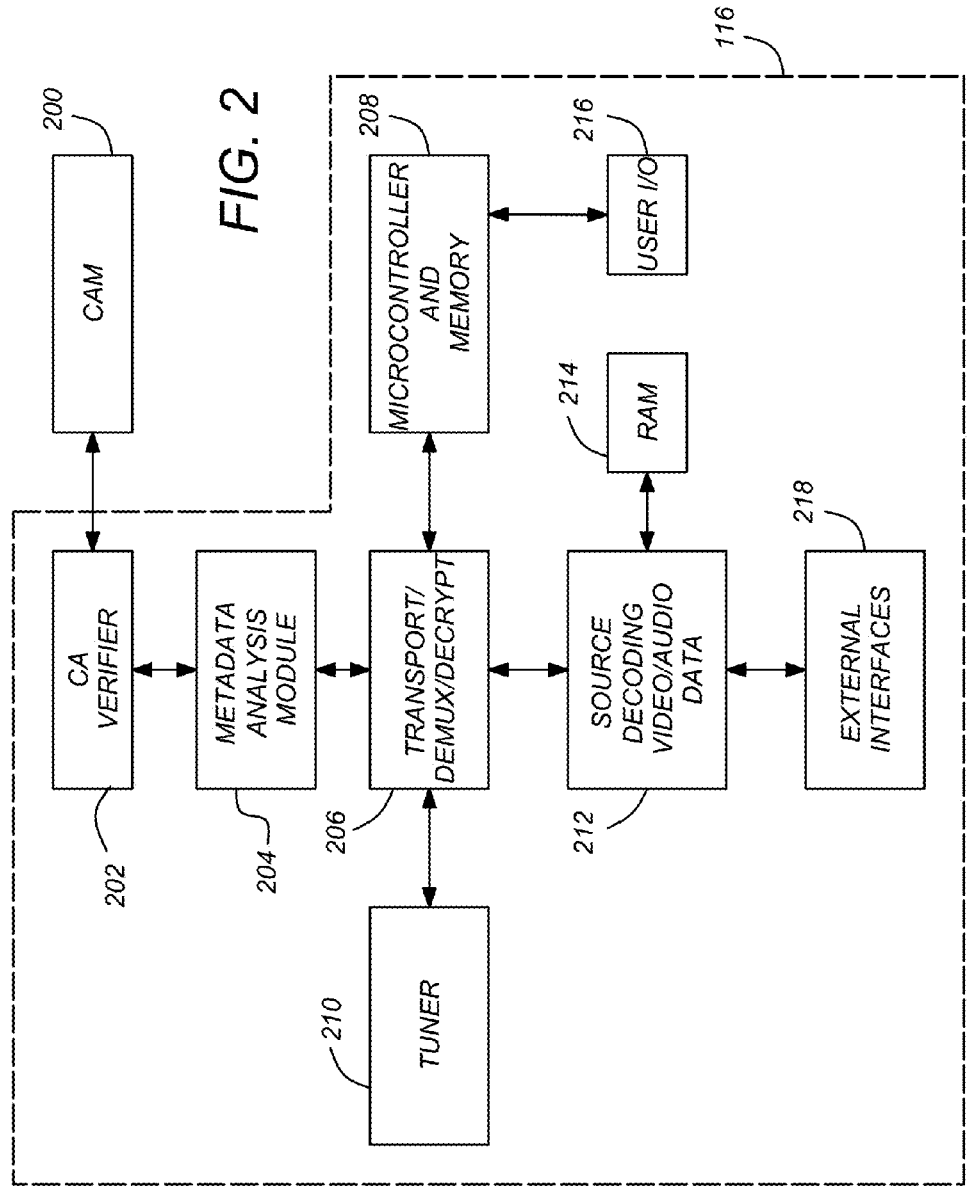
FIG. 2 is a simplified block diagram of the IRD portion of a PVR.

FIG. 2 is a simplified block diagram of the IRD portion 116 of a PVR 102. The IRD 116 receives and decrypts the media programs that are encoded on the removable storage device 114.

The IRD 116 is communicatively coupleable to a conditional access module (CAM) 200. The CAM 200 is typically implemented in a smart card or similar device, which is accessible by the IRD 116 or PVR 102, or can be provided electronically to the IRD 116 or PVR 102. The CAM 200 interfaces with a conditional access verifier (CAV) 202 which performs at least some of the functions necessary to verify that the IRD 116 and/or PVR 102 is entitled to access the media programs. The CAV 202 is communicatively coupled to a metadata analysis module (MAM) 204. Using the information in metadata table (e.g. Table 1 described below), the MAM 204 acts as a gate-keeper to determine whether stored media programs will be decrypted and presented to the subscriber. This is accomplished by comparing the metadata values with measured or accumulated values. The CAV 202 and the MAM 204 can be implemented as separate modules from the transport/demux/decryptor 206 and the microcontroller and memory 208 as shown, or may be implemented via software instructions stored in the memory and performed by the microcontroller 208.

The IRD 116 further comprises a tuner 210, a transport and demultiplexing module (TDM) 206, which operates under control of a microcontroller and associated memory 208, a source decoder 212 and communicatively coupled random access memory (RAM) 214, and a user I/O device 216 for accepting subscriber commands and for providing output information to the subscriber.

The tuner 210 receives the data packets from the video distribution system and provides the packets to the TDM 206. Using the Service Channel IDs (SCIDs) associated with each media program, the TDM 206 reassembles the data packets according to the channel selected by the subscriber, and unencrypts the media programs using the CW key. The TDM 206 can be implemented by a single secure chip, and is communicatively coupled to a microcontroller and memory 208.

Once the media programs are unencrypted, they are provided to the source decoder 212 which decodes the media program data according to MPEG or JPEG standards as appropriate. The decoded media program is then provided to a D/A converter (if necessary) and provided to external interfaces 218 which can include a media program presentation device such as a television, an audio system, or a computer. The source decoder 212 makes use of communicatively coupled RAM 214 to perform these functions.

The CW key is obtained from the CW Packet (CWP) using the CAV 202 and the CAM 200. The TDM 206 provides the CWP to the CAM 200 via the CAV 202. The CAM 200 uses the I/O indecipherable algorithm to generate the CW, which is provided back to the TDM 206. The TDM 206 uses the CW to decrypt the media programs. In most IRDs 116, the CAV 202 and the CAM 200 are capable of decrypting one video/audio/data media program at a time.

As described above, to discourage potential pirates, the control data in the CWP used to decode a particular media program may change with time so that it only produces the proper CW when applied to a media program having the proper time stamp. In this case, the CAM 200 can select and/or control the decryption scheme (e.g. the I/O indecipherable algorithm) according to the time stamp associated with the data stream carrying the media program. If the media program is sufficiently disassociated in time, the improper decryption scheme will be used, and the proper CW to decode the media program will not be produced.

Further details regarding the encryption and decryption of media programs can be found in co-pending and commonly assigned U.S. patent application Ser. No. 09/491,959, which is incorporated by reference herein.

Mass Mailing/Other Delivery of Content

Alternatively, or in conjunction with the embodiment described above, users can receive generically encrypted content on a removable storage device 114 that is mass-mailed or otherwise delivered directly to user's homes. Other methods of delivery of the generically encrypted content include Internet delivery, delivery to a PVR 102 via satellite signal during periods of non-use of the PVR 102 (also known as background delivery), etc. In order to decrypt and gain access to the content, the content provider must provide the PVR 102 with an encrypted version of a key, typically called an Access Key, which can only be used on the PVR 102 that requests the Access Key. Each user, and, as such, each PVR 102, that requests access to the content receives their own uniquely encrypted version of the Access Key, which prevents a user from requesting a key on their own PVR 102, and loaning the removable storage device 114 with the generically encrypted content to an acquaintance for viewing elsewhere, because all other PVRs 102 would not have a matching Access Key for that removable storage device 114.

A removable storage device 114 can have multiple programs or content that can have various levels of access, e.g., there can be a preview or "trailer" on the removable storage device 114 to introduce the content to the user, which can be accessed without an Access Key, but, in order to view the remainder or entire content, the Access Key must be provided. Further, there can be multiple programs each requiring a different Access Key on a single removable storage device 114.

When the user requests the Access Key from the content provider for a given program or a given removable storage device 114, each program purchased from the medium would be reported back to the service provider at the time of Access Key request for billing purposes, similar to a Pay-Per-View scheme. However, a user could purchase the content in various ways, as described herein below.

Payment Methods

In the embodiments of the present invention, several different payment methods are possible. The methods listed herein are merely for illustrative purposes, and are not meant to limit or otherwise narrow the scope of the present invention.

Pay Per View

The present invention allows for the removable storage device 114 to be paid for on a viewing by viewing basis of the program content encrypted thereon. This is typically known as "Pay-Per-View" (PPV) billing. For example, a customer can visit the local video store and have a selected title or titles copied to the removable storage device 114. The customer can then pay for a single viewing of each title copied onto the removable storage device 114, or a specific number of viewings of each title copied onto the removable storage device 114. Each title can be charged differently even though they are physically located on the same removable media, e.g., title 1 can have a single viewing, and title 2 can have three viewings. Further, the first viewing can be charged a different price than subsequent viewings of the removable storage device 114 or copies of titles stored on the removable storage device 114. Alternatively, the removable storage device 114 that is mailed or otherwise delivered to a customer can be charged on a PPV basis, where each time the removable storage device is viewed, or each time a certain scene is viewed, or each time a certain amount of time of the removable storage device is viewed, the customer is charged.

Pay Per Period

The present invention also allows for customers to be charged to view the program content over a given period of time. For example, once a customer has visited the video store to receive the encrypted program content, the program content on the removable storage device 114 will be accessible for a certain amount of time after a specified start time. The start time can be selected as beginning at the time the program content is placed on the removable storage device 114, or from the first viewing of the program content on the removable storage device 114. Different prices can be charged depending on which start time is chosen, the length of time that the program can be accessed, etc., without departing from the scope of the present invention.

Purchase

The present invention also allows for customers to choose a video for outright purchase, which can be copied onto a removable storage device 114. This allows for a given content to be sold without fear of copying, because the removable storage device 114 will only be viewable on a PVR 102 that has the proper access key for that specific removable storage device 114.

Flowchart

Figure 3:
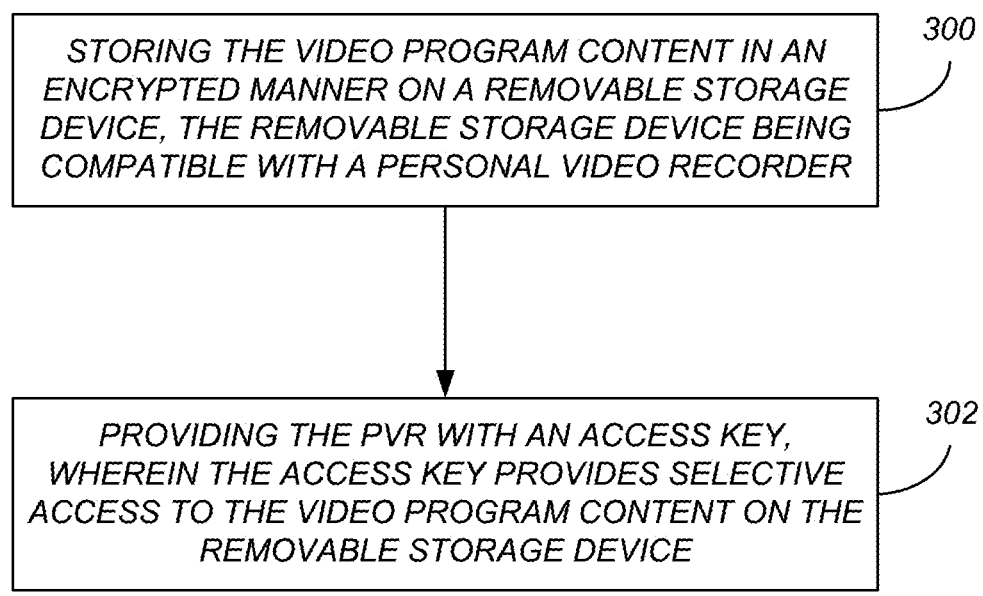
FIG. 3 is a flowchart illustrating the steps used in performing the present invention.

FIG. 3 is a flowchart illustrating the steps used in performing the present invention.

Box 300 represents storing the video program content in an encrypted manner on a removable storage device, the removable storage device being compatible with a Personal Video Recorder (PVR).

Box 302 represents providing the PVR with an access key, wherein the access key provides selective access to the video program content on the removable storage device.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

The present invention discloses a method and apparatus for delivering video program content with selective viewing capability. An apparatus in accordance with the present invention comprises a personal video recorder (PVR), an access key, coupled to the PVR, and a storage medium containing the video program content, wherein the video program content is stored on the storage medium in an encrypted manner, the access key is used to access the program content on the storage medium, and the storage medium is removable from the PVR.

It is intended that the scope of the invention be limited not by this detailed description, but rather by the claims appended hereto and the equivalents thereof. The above specification, examples and data provide a complete description of the manufacture and use of the composition of the invention. Since many embodiments of the invention can be made without departing from the spirit and scope of the invention, the invention resides in the claims hereinafter appended and the equivalents thereof.

What is claimed is:

1. An apparatus for providing a stored media program with selective restrictive viewing capability for viewing by a user, comprising:
    a receiver, having:
        a tuner for receiving a broadcast media program transmitted by a direct broadcast system and for receiving, from the direct broadcast system, an access key in response to a request transmitted from the receiver to the direct broadcast system; and
        a conditional access module and conditional access verifier for decrypting the broadcast media program transmitted by the direct broadcast system and for decrypting an encrypted version of the stored media program according to the access key; and
    a storage medium having the encrypted version of the stored media program, the encrypted version of the stored media program received from a source independent from the direct broadcast system and decryptable by the conditional access module and conditional access verifier using the access key.

2. The apparatus of claim 1, wherein the access key is encrypted uniquely to the receiver.

3. The apparatus of claim 1, wherein the access key is shared among multiple receivers.

4. The apparatus of claim 1, wherein the encrypted version of the stored media program is stored by a content provider.

5. The apparatus of claim 4, wherein the media program is stored by the content provider on the storage medium by request of the user.

6. The apparatus of claim 1, wherein the media program is delivered to the receiver for storage on the storage medium via the Internet.

7. The apparatus of claim 1, wherein a payment is charged to view the stored media program.

8. The apparatus of claim 7, wherein a payment is charged to view the stored media program during a predefined period of time.

9. The apparatus of claim 7, wherein a second payment is charged to view the stored media program at least a second time.

10. An apparatus for providing a stored media program with selective restrictive viewing capability to a user, comprising:
    a receiver, having:
        a tuner, for receiving a broadcast media program transmitted by a direct broadcast system, and for receiving an encrypted access key;
        a conditional access module and conditional access verifier for decrypting the encrypted access key and for decrypting the stored media program using the decrypted access key; and
    a storage medium having the stored media program, the stored media program received from a source independent from the direct broadcast system and decryptable using the decrypted access key.

11. The apparatus of claim 10, wherein the stored media program is stored on the storage medium by a request of the user.

12. The apparatus of claim 10, wherein the access key is encrypted uniquely to the receiver.

13. The apparatus of claim 10, wherein the access key is shared among multiple receivers.

14. The apparatus of claim 10, wherein the storage medium is generically encrypted, and access to the stored media program is controlled by the access key.

15. The apparatus of claim 10, wherein the media program is delivered to the receiver for storage on the storage medium via the Internet.

16. A method for providing a stored media program with selective viewing capability, comprising:
    storing the media program in an encrypted manner on a storage device, the storage device being included with a receiver having a tuner for receiving a broadcast media program transmitted by a direct broadcast system and a conditional access verifier and conditional access module for decrypting the broadcast media program transmitted by the direct broadcast system;
    receiving an access key in the receiver from the direct broadcast system via the tuner;
    providing selective access to the stored media program via the conditional access module and conditional access verifier using the received access key;

wherein the stored media program is received from a media program source independent from the direct broadcast system.

17. The method of claim 16, wherein the access key is encrypted uniquely to the receiver.

18. The method of claim 16, wherein the access key is shared by more than one receiver.

19. The method of claim 16, wherein the media program source is a content provider.

20. The method of claim 16, wherein the media program is delivered to the receiver for storage on the storage device via the Internet.

* * * * *